United States Patent Office 2,972,191
Patented Feb. 21, 1961

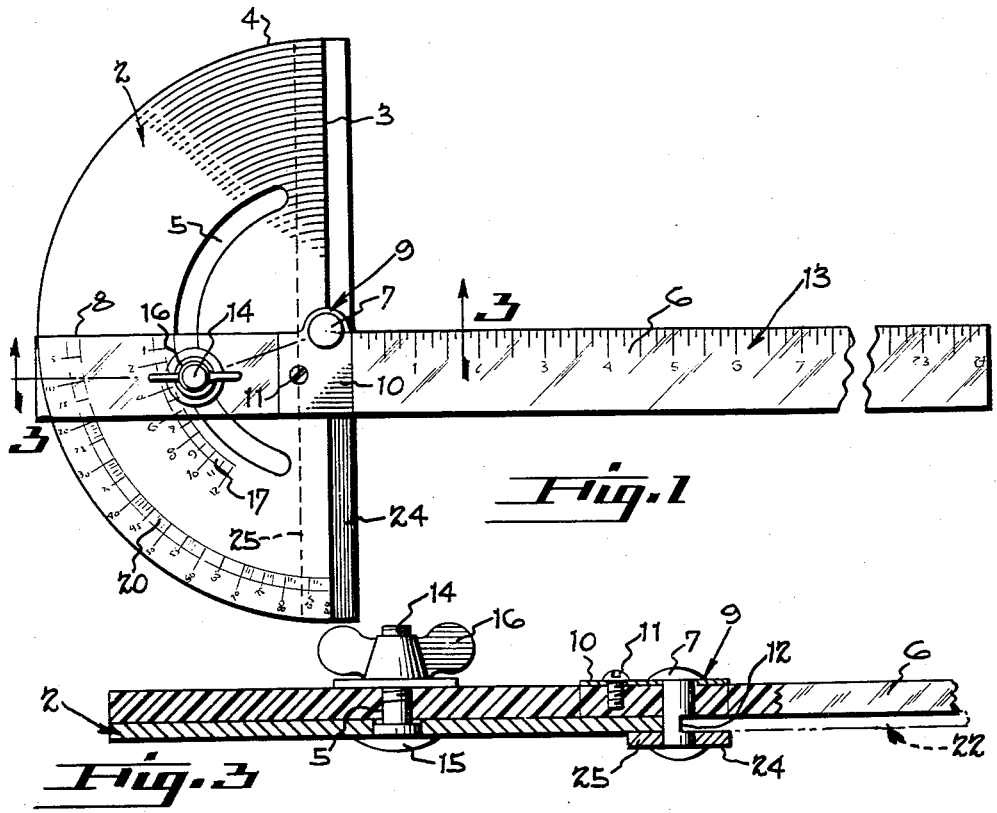
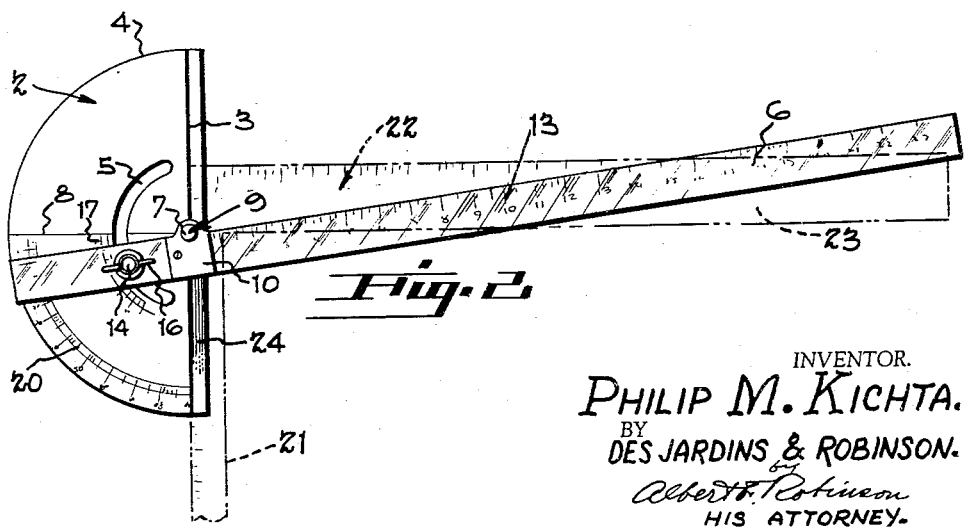
INVENTOR.
PHILIP M. KICHTA.
BY DES JARDINS & ROBINSON.
Albert F. Robinson
HIS ATTORNEY.

2,972,191
MEASURING OR COMPUTING TOOL

Philip M. Kichta, 1245 State Ave., Cincinnati 4, Ohio, assignor of twenty-five percent to Charles A. Bauscher, twenty-five percent to Alice R. Mueller, and twenty-five percent to George James Eatrides, all of Cincinnati, Ohio Filed June 4, 1957, Ser. No. 663,397

2 Claims. (Cl. 33—100)

This invention relates to a measuring or computing tool, and it particularly pertains to a tool or device for quickly computing the measurements in engineering or construction work for quickly measuring distances, heights, lengths and the like.

The device comprises a semicircular half section of a circular flat plate or disc having a measuring stick pivoted at the axis of the diameter, which is the bottom edge of said disc, to be aligned with indicia carried on the face of said semicircular half section for making computations. Said device is used with a conventional carpenter's measuring square wherein one leg of said square is abutted against the straight edge of the semicircular half section for the other leg thereof to be projected for measuring off a certain length on the pivoted measuring stick. With one leg, the tongue, of the measuring square disposed along the diameter of the semicircular disc, which is the bottom straight side of the half disc, for measuring a certain distance from the center, the other leg of the square, the body, is projected in position to measure of a distance on the measuring stick, this being at their point of intersection. Certain indicia are provided on different parts of the face of the half disc for use with the measuring stick for making computation. One indicia is set off in inches from about 1 to 12, for pitch which accords with the inch units on the tongue of a conventional square. With the measuring stick adjusted to this indicia at any selected pitch, the inch unit on the tongue of the square will correspond therewith when abutted against the straight edge of the disc to measure off a desired distance on the body of the square. The point of intersection of the body of the measuring square with the measuring stick will be the measurement. For example, with the measuring stick set to register with a selected pitch of the pitch indicia, and with half the width of the building measured off on the body of the measuring square, its point of intersection with the measuring stick will give the required length of the rafters in a building to be erected. Other indicia is set off in degrees from 1 to 90 to determine the length, depth or diagonal. This is set off on the arcuate edge of the disc. With the measuring stick set at any selected degree on this indicia and with the known measurement of the diagonal set off on the measuring stick, the lengths of either of the other two sides of the right angle is shown. Or with the length of either of said two sides being known, the length of the diagonal and the other sides of the right triangle is given.

Accordingly, one of the main objects of the invention is a computing tool which is simple in construction and efficient in operation.

Another object of the invention is a computing tool for quickly computing length, height, and depth in building and engineering projects to be erected.

Another object of the invention is a computing tool for finding the length of the diagonal and sides of a right triangle.

Another object of the invention is a tool adapted for use with a conventional measuring square for quickly computing dimensions in building and engineering projects such as building and like constructions.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of this specification in which:

Fig. 1 is a top plan view of one embodiment of the invention.

Fig. 2 is a top plan view of the device with a measuring square inserted in place for use in connection with the device.

Fig. 3 is a detailed view of the device.

Referring specifically to the drawings in which like numerals designate like parts, numeral 2 is a half section of a circular disc or plate of any suitable material, but preferably of metal or some such durable material. This semicircular section 2 has a base straight edge 3 and a semicircular top edge 4, the straight edge 3 being the diameter of a circle coincident with the circular top edge 4. An arcuate slot 5 is provided in the half circle section 2 between the bottom and top edges 3 and 4.

A measuring stick 6 is pivoted to the semicircular section 2 by a pivot pin 7 whose axis extends through the center of the bottom straight edge 3 and at the intersection of said center with the vertical medial line 8. The axis of the pivot pin 7 is that from which the circumference of the semicircular top edge 4 is described. The measuring stick 6 is pivotally connected to the pivot pin 7 in any suitable manner, such as being directly pivoted thereto or by a fitting 9 fastened to said measuring stick 6 by means of plate 10 secured by a clamp bolt 11. In order that the pivot pin may be flush with the straight edge 3 of the half disc, a portion thereof may be grooved at 12 on one side. This measuring stick 6 is marked off in units of inches and numbered consecutively from the pivot point 7 to its opposite free end, the indicia for the units of inches on the measuring stick being referred to generally by the numeral 13.

Another clamp bolt 14 is provided on the measuring stick 6 extending through the arcuate slot 5 of the half disc 2 with its head 15 overhanging the margins of the slot and its opposite end projected through the measuring stick 6 for a thumb nut 16 to be fitted thereto so that the bolt may be readily unclamped for pivoting said measuring stick to any desired position in which it is then clamped.

On the face of the half circle section 2 is indicia 17 numbered consecutively from the vertical medial line 8 toward the left hand end of the said half section. This indicia 17 is of a graduated scale in inch per foot pitch, for example. One-twelfth of an inch on the measuring stick 6 will represent a one inch length. With the measuring stick set on the indicia 17 to represent the selected pitch of the building, and with the body of the measuring square fitted in place in respect to the straight edge 3 of the tool, said measuring square will measure off the distance on the measuring stick at its intersecting point. For example, for computing lengths of rafters or other member, the grade angle of the roof is selected. Then the known half width of the building is measured off on the body of the measuring square, and at the point of its intersection with the measuring stick, the length of the rafter will be shown.

Other indicia 20 may be provided on the face of the semicircular disc, this being preferably disposed along the semicircular top edge 4, and this indicia is graduated in degrees from 1 to 90 for selecting any angle of grade. The measuring stick 6 is adjusted to align with the given degree of angle of grade with the measurement of any given side of the right triangle, either or both of the other sides are computed. For example, with the measuring stick set at a 30° angle and with a 20 ft. diagonal length measured off on the measuring stick, the intersecting point of said measuring stick on the square gives the length of the two sides of the triangle immediately. The measurement of the diagonal can be obtained with the known measurement of one of the sides of the triangle.

In order to hold the tongue 21 of a conventional measuring square 22 against the straight edge 3 of the half circular disc with the body 23 of said square extended to intersect the measuring stick 6, the straight edge 3 of the half disc may advantageously be provided with a bottom lap extension 24 on which the bottom side of the tongue 21 of the square will rest when the edge of said tongue is held in abutting relation against the straight edge 3 of the half circle section. This lap extension 24 may be provided by a plate 25 fixed, as by welding, to the bottom side of the half circle section with the lap portion 24 projecting from the bottom side beyond said straight edge. The thickness of the half circle section is preferably of the same thickness as a conventional measuring square so that said square may be readily inserted in place against the straight edge portion 3 of the half circle section beneath the measuring stick. The measuring stick, when clamped in position by clamp bolt 15, will also lightly clamp the measuring square to hold it in position.

While the unit of measurement on the tool has been given in inches, it will be understood that other units of measurements may be used. These may be such that the tool may be of pocket size. The construction is the same whatever be used as the unit or measurement thereon. Moreover, the measuring stick is preferably of transparent material as this clearly exposes therethrough the unit of measurement on the legs of the measuring square.

From the foregoing description, it will be seen that this device may be easily used with a conventional measuring square for computing the length of the rafters.

I am aware that there may be various changes in details of construction without departing from the spirit of my invention, and, therefore, I claim the invention broadly as indicated by the appended claims.

Having thus described my invention, what I claim as new and useful and desire to secure by United States Letters Patent, is:

1. A measuring tool for computing measurements comprising a semicircular disc section having a bottom and straight edge which is the diameter of a circle coincident with the circumferential edge of said disc, a measuring stick pivoted to said section at the axis of the disc, clamp means for holding the measuring stick in selected pivoted position, means lapping the straight edge of said disc and extending therefrom to provide a seat for seating one leg of a measuring square that is adapted to be abutting against said straight edge and said clamp means for the measuring stick being adapted to clamp the measuring square in position.

2. In combination with a conventional measuring square, a carpenter's tool for computing the measurements comprising a semicircular disc section having a bottom straight edge which is the diameter of a circle coincident with the circumferential edge of said disc, a measuring stick pivoted to said section at the axis of the disc, clamp means for holding the measuring stick in selected pivoted position, means lapping the bottom straight edge and extending therefrom to provide a seat for the disc for seating one leg of the measuring square that is abutted against said straight edge and said measuring square being clamped in position by said clamp means.

References Cited in the file of this patent
UNITED STATES PATENTS

| | | |
|---|---|---|
| 833,535 | Luther | Oct. 16, 1906 |
| 1,032,493 | Myers | July 16, 1912 |
| 1,549,271 | Larson | Aug. 11, 1925 |
| 1,655,638 | West | Jan. 10, 1928 |
| 2,368,958 | Williams | Feb. 6, 1945 |